United States Patent
Levijoki et al.

(10) Patent No.: US 8,869,513 B2
(45) Date of Patent: Oct. 28, 2014

(54) EXHAUST DIAGNOSTIC CONTROL SYSTEM AND METHOD WITH NH3 DEPLETION CLEANSING

(75) Inventors: Stephen Paul Levijoki, Swartz Creek, MI (US); Justin A. Shetney, Livonia, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 210 days.

(21) Appl. No.: 13/451,202

(22) Filed: Apr. 19, 2012

(65) Prior Publication Data

US 2013/0276428 A1 Oct. 24, 2013

(51) Int. Cl.
*F01N 3/00* (2006.01)
*F01N 3/10* (2006.01)

(52) U.S. Cl.
USPC .......... 60/286; 60/274; 60/295; 60/301; 60/303

(58) Field of Classification Search
USPC .......... 60/274, 276, 286, 295, 301, 303
See application file for complete search history.

(56) References Cited

U.S. PATENT DOCUMENTS

| | | | |
|---|---|---|---|
| 8,454,916 B2 | 6/2013 | Perrin et al. | |
| 2011/0061372 A1* | 3/2011 | Levijoki et al. | 60/286 |
| 2011/0311420 A1* | 12/2011 | Perrin et al. | 423/213.2 |
| 2013/0014575 A1 | 1/2013 | Levijoki et al. | |

FOREIGN PATENT DOCUMENTS

| | | |
|---|---|---|
| DE | 102006041135 A1 | 3/2007 |
| DE | 102010036153 A1 | 3/2011 |
| DE | 102011104233 A1 | 12/2011 |
| DE | 102012212220 A1 | 1/2013 |

OTHER PUBLICATIONS

German Office Action for Application No. 102013206654.6 dated Jul. 1, 2014; 7 pages.

* cited by examiner

*Primary Examiner* — Audrey K Bradley
(74) *Attorney, Agent, or Firm* — Cantor Colburn LLP (57) ABSTRACT

An exhaust diagnostic control system comprises a test enabling module, an exhaust gas temperature management module, and an exhaust diagnostic control system. The test enabling module is configured for executing a process for depleting a reductant load and subsequently establishing a known concentration of reductant on an after-treatment component following an occurrence of one or more trigger events. The exhaust gas temperature management module is configured for selectively adjusting a temperature of the after-treatment component to a predetermined temperature range using intrusive exhaust gas temperature management. The component management module is configured for executing a NOx reduction efficiency test following completion of the process for depleting a reductant load and subsequently establishing a known concentration of reductant on the after-treatment component. The NOx reduction efficiency test comprises determining a NOx reduction efficiency associated with the after-treatment component.

20 Claims, 3 Drawing Sheets

EXHAUST DIAGNOSTIC CONTROL SYSTEM AND METHOD WITH NH3 DEPLETION CLEANSING

FIELD OF THE INVENTION

The subject invention relates to vehicle exhaust systems, and more particularly to exhaust diagnostic and control systems and methods that evaluate and control performance of after-treatment components and processes.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

During combustion in a diesel engine, an air/fuel mixture is delivered through an intake valve to cylinders and is compressed and combusted therein. After combustion, the pistons force the exhaust gas in the cylinders into an exhaust system. The exhaust gas may contain oxides of nitrogen (NOx) and carbon monoxide (CO).

Exhaust gas treatment systems may employ catalysts in one or more components configured for accomplishing an after-treatment process such as reducing nitrogen oxides (NOx) to produce more tolerable exhaust constituents of nitrogen (N2) and water (H2O). Reductant may be added to the exhaust gas upstream from an after-treatment component, such as a selective catalyst reduction (SCR) component, and, for example only, the reductant may include anhydrous ammonia (NH3), aqueous ammonia or urea, any or all of which may be injected as a fine mist into the exhaust gas. When the ammonia, mixed with exhaust gases, reaches the after-treatment component, the NOx emissions are broken down. A Diesel Particulate Filter (DPF) may then capture soot, and that soot may be periodically incinerated during regeneration cycles. Water vapor, nitrogen and reduced emissions exit the exhaust system.

To maintain efficient NOx reduction in the after-treatment component, a control may be employed so as to maintain a desired quantity of the reductant (i.e., reductant load) in the after-treatment component. As exhaust gas containing NOx passes through the after-treatment component, the reductant is consumed, and the load is depleted. A model may be employed by the control to track and/or predict how much reductant is loaded in the after-treatment component and to inject additional reductant as required so as to maintain an appropriate reductant load for achieving a desired effect such as reduction of NOx in the exhaust stream.

Service regeneration of the DPF is often conducted at elevated exhaust temperatures. Because of these increased temperatures, a flow of reductant through the injector(s) may be maintained so as to prevent thermal damage of the injector. Unfortunately, it can be difficult to predict how much of the reductant injected for such purposes is oxidized or otherwise consumed in the after-treatment component and how much may have survived and accumulated so as to contribute to the loading of the after-treatment component.

As a consequence, model estimates of ammonia load may be inaccurate, and may thus be rendered unreliable. In particular, experience has shown that following the occurrence of certain events, such as a DPF service regeneration event, load estimates based on models may deviate substantially from observed levels of NH3 load on the after-treatment component. Hence, diagnostic processes based on measurement and evaluation of NOx reduction efficiencies in the after-treatment component may produce erroneous results such as where more reductant is actually loaded on the after-treatment component than the diagnostic system assumes based on the inaccuracies in the model. In such situations, NH3 "slip" can occur wherein NH3 is interpreted by downstream sensors as NOx. Such errors are particularly problematic when using sensors that are cross-sensitive to both NOx and NH3. Similarly, where an actual NH3 load is substantially lower than the model estimate, the incorrect NH3 load can cause a worse than expected NOx reduction efficiency to be assessed by the diagnostic system, potentially resulting in an incorrect diagnosis and invocation of remedial measures to be taken.

Accordingly, it is desirable to provide a system and method for more accurately predicting a quantity of reductant (i.e., the reductant load) present on after-treatment components and for managing the operations through which NOx are reduced in such after-treatment components with improved reliability following one or more trigger events.

SUMMARY OF THE INVENTION

In one exemplary embodiment of the invention, an exhaust diagnostic control system comprises a test enabling module, an exhaust gas temperature management module, and an exhaust diagnostic control system. The test enabling module is configured for executing a process for depleting a reductant load and subsequently establishing a known concentration of reductant on an after-treatment component following an occurrence of one or more trigger event. The exhaust gas temperature management module is configured for selectively adjusting a temperature of the after-treatment component to a predetermined temperature range using intrusive exhaust gas temperature management. The component management module is configured for executing a NOx reduction efficiency test following completion of the process for depleting a reductant load and subsequently establishing a known concentration of reductant on the after-treatment component. The NOx reduction efficiency test comprises determining a NOx reduction efficiency associated with the after-treatment component.

In another exemplary embodiment of the invention, a method for diagnosing an exhaust system comprises depleting a reductant load on an after-treatment component following an occurrence of one or more trigger event and subsequently establishing a known concentration of reductant on the after-treatment component. The method also comprises selectively adjusting a temperature of the after-treatment component to a predetermined temperature range using intrusive exhaust gas temperature management and executing a NOx reduction efficiency test comprising determining a NOx reduction efficiency associated with an after-treatment component.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term "module" refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

While the following disclosure involves diesel engines, other types of engines such as gasoline engines, including direct injection engines, may benefit from the teachings herein.

In accordance with an exemplary embodiment of the invention, the present disclosure provides a system and method for resetting an exhaust diagnostic control system of a vehicle upon the occurrence of one or more trigger events or criteria. The control may be reset automatically or via an intrusive service test that may be initiated by a service test tool. A trigger event may comprise an assessment that a quality of a reductant exhibits inadequate quality, an occurrence of a recent service regeneration event, an indication of an elevated risk of an uncontrolled or unknown ammonia load on an after-treatment component, a determination that the ammonia load model may be inaccurate, or other events or criteria suggesting the need for testing the effectiveness of an after-treatment component, or the system as a whole, at reducing targeted constituents such as NOx.

For example, rather than waiting to see a NOx deviation before triggering a system reset, in an exemplary embodiment, reductant may be purged as soon as an elevated risk is identified of a potential future NOx deviation. Accordingly, rather than waiting for confirmation of such a NOx deviation, the after-treatment component may proactively be purged of ammonia and then reloaded with a known quantity of ammonia (reductant) so as to improve the reliability of control systems, which depend upon reliable knowledge of, and control over, the loading of ammonia on the after-treatment component. Thus, to improve the accuracy and/or reliability of reductant load predictions, an exemplary service procedure begins by re-calibrating the model responsible for creating those predictions. The service procedure accomplishes the calibration by establishing a known reductant load in or on the after-treatment component. In some embodiments, the service procedure achieves the calibration by executing a service regeneration test that is effective to reliably consume any reductant load in the after-treatment component.

Thus, upon the occurrence of criteria indicating that a sufficiently substantial risk exists that an actual reductant load in an after-treatment component fails to match a load predicted by a load model, such as may occur following detection/assessment of poor urea quality, an actual and reliably knowable reductant load is re-established in the after-treatment component, resulting in improved model accuracy. More specifically, after the service regeneration test, and provided that injector cooling via continuing injection of reductant has not occurred, the reductant load can reliably be assumed to be within an acceptable tolerance of a known level, e.g., zero. With the reductant load established, the model may be calibrated or otherwise re-set so that its prediction for reductant load matches the known level. With the model having been re-calibrated, normal control functions can be executed with improved accuracy and reliability.

More specifically, in an exemplary embodiment, upon the occurrence of one or more triggering criteria, the reductant load on the after-treatment component is intentionally depleted using reliable means such as execution of a regeneration event, so that the reductant load may reliably be at or below a pre-established threshold. This reductant-depleting, SCR-cleansing process may be performed as an initial step in the re-calibration of the load model. In a non-limiting exemplary embodiment, a cleansing process for an after-treatment component includes commanding dosing off until the load of NH3 or another reductant has been sufficiently depleted from the after-treatment component to a level below a predetermined threshold. An algorithm may be employed to evaluate the degree to which NOx are reduced in the after-treatment component so as to verify the extent to which reductant has been depleted.

The sufficient depletion of reductant can be confirmed by comparing information signals produced by the upstream and downstream NOx sensors so as to verify that any detectable difference between their outputs is within an acceptable level. In addition, or in the alternative, an algorithm based on empirical experience may be used to determine the extent of the depletion. For example, for a particular system, operation of the system may have been sufficiently characterized that rates of reductant consumption may be understood for certain operating conditions. Accordingly, the procedure provides assurance that the load of reductant is at a known level. After the NH3 load has been depleted, normal dosing can be commenced to re-establish a known (i.e., reliably predictable by the NH3 load model) NH3 load on the NOx catalyst.

As described above, the exhaust diagnostic control system according to the present disclosure first depletes the reductant load on the after-treatment component until the load is below a preset threshold. This may be accomplished by commanding, or maintaining, dosing of reductant at a level below a predetermined level until the reductant load has been sufficiently depleted from the after-treatment component. This predetermined level may be completely off, as described above, or may be set at one or more levels configured to result in depletion of reductant on the after-treatment component such as at levels less than the rate at which reductant is consumed in the SCR. It should be noted that it may be impractical to command dosing to be completely off. For example, in some situations, it is necessary to dose the exhaust stream with reductant so as to cool the reductant injection nozzles. Once the reductant has been sufficiently depleted, a condition that may be verified by an indication from the NOx sensors and/or from the model-predicted consumption of reductant in the SCR, the load of reductant will be at a reliably-knowable level, at or near zero.

As soon as the sufficient depletion of reductant has been confirmed, such as by comparing information signals produced by the upstream and downstream NOx sensors and verifying that any detectable difference between their outputs is within an acceptable level and/or by observing an indication from the load model that the after-treatment component is unloaded. The reductant load may reliably be considered to have been depleted, and normal dosing can be commenced to re-establish a known (i.e., reliably predictable by the reductant load model) load of reductant on the after-treatment catalyst.

Figure 1:
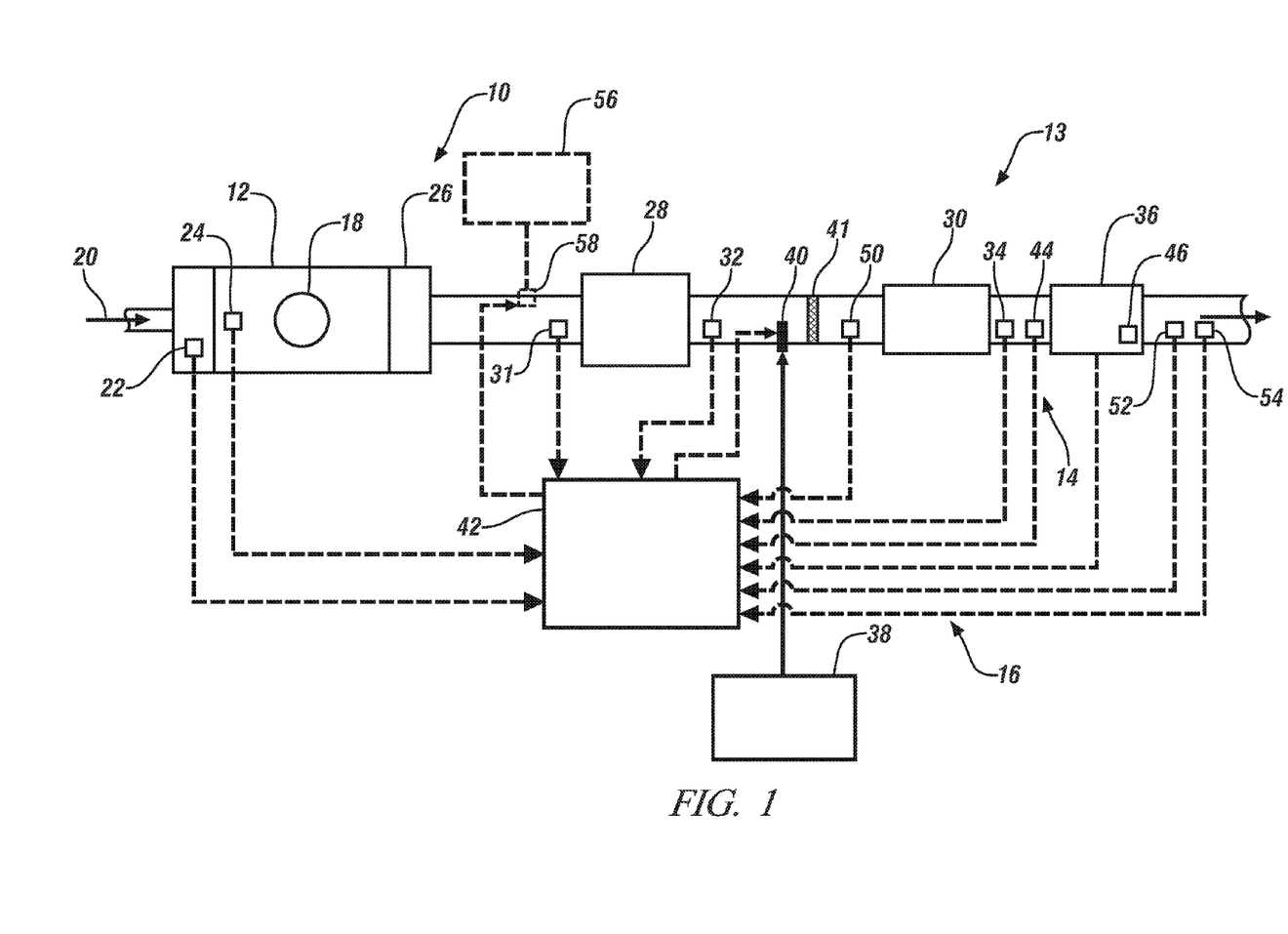
FIG. 1 is a functional block diagram of an engine control system including an exhaust diagnostic control system that automatically resets upon the occurrence of one or more triggering criteria according to the present disclosure.

Referring now to FIG. 1, a diesel engine system 10 is schematically illustrated. The diesel engine system 10 includes a diesel engine 12 and an exhaust treatment system 13. The exhaust treatment system 13 further includes an exhaust system 14 and a dosing system 16. The diesel engine 12 includes a cylinder 18, an intake manifold 20, a mass air flow (MAF) sensor 22 and an engine speed sensor 24. Air flows into the diesel engine 12 through the intake manifold 20 and is monitored by the MAF sensor 22. The air is directed into the cylinder 18 and is combusted with fuel to drive pistons (not shown). Although a single cylinder 18 is illustrated, it can be appreciated that the diesel engine 12 may include additional cylinders 18. For example, diesel engines having 2, 3, 4, 5, 6, 8, 10, 12 and 16 cylinders are anticipated.

Exhaust gas is produced inside the cylinder 18 as a result of the combustion process. The exhaust system 14 treats the exhaust gas before the exhaust gas is released to atmosphere. The exhaust system 14 includes an exhaust manifold 26 and a diesel oxidation catalyst (DOC) 28. The exhaust manifold 26 directs exhaust exiting the cylinder through the DOC 28. The exhaust is treated within the DOC 28 to reduce the emissions. The exhaust system 14 further includes an after-treatment component 30, a temperature sensor 31, an inlet temperature sensor 32, an outlet temperature sensor 34 and a particulate filter (PF) 36. In an exemplary embodiment, after-treatment component 30 is a selective catalyst reduction (SCR) component.

The temperature sensor 31 may be positioned between the engine and the DOC 18. The inlet temperature sensor 32 is located upstream from the after-treatment component 30 to monitor the temperature change at the inlet of the after-treatment component 30. The outlet temperature sensor 34 is located downstream from the after-treatment component 30 to monitor the temperature change at the outlet of the after-treatment component 30. Although the exhaust treatment system 13 is illustrated as including the inlet and outlet temperature sensors 32, 34 arranged outside the after-treatment component 30, the inlet and outlet temperature sensors 32, 34 can be located inside the after-treatment component 30 to monitor the temperature change of the exhaust at the inlet and outlet of the after-treatment component 30. The PF 36 further reduces emissions by trapping particulates (i.e., soot) in the exhaust gas.

The dosing system 16 includes a dosing injector 40 that injects reductant from a reductant supply 38 into the exhaust gas. The reductant mixes with the exhaust gas and further reduces the emissions when the mixture is exposed to the after-treatment component 30. A mixer 41 may be used to mix the reductant with the exhaust gas upstream from the after-treatment component 30. A control module 42 regulates and controls the operation of the engine system 10.

An exhaust gas flow rate sensor 44 may generate a signal corresponding to the flow of exhaust in the exhaust system. Although the sensor is illustrated between the after-treatment component 30 and the PF 36, various other locations within the exhaust system may be used for measurement including downstream from the exhaust manifold and upstream from the after-treatment component 30. A temperature sensor 46 generates a particulate filter temperature corresponding to a measured particulate filter temperature. The temperature sensor 46 may be disposed on or within the PF 36. The temperature sensor 46 may also be located upstream or downstream from the PF 36.

Other sensors in the exhaust system may include an upstream NOx sensor 50 that generates a NOx signal based on a concentration of NOx present in the exhaust system. A downstream NOx sensor 52 may be positioned downstream from the PF 36 to measure a concentration of NOx leaving the PF 36. In addition, an ammonia (NH3) sensor 54 generates a signal corresponding to the amount of ammonia within the exhaust gas. The NH3 sensor 54 is optional, but can be used to simplify the control system due to the ability to discern between NOx and NH3. Alternately and/or in addition, a hydrocarbon (HC) supply 56 and a HC injector 58 may be provided to supply HC in the exhaust gas reaching the DOC catalyst.

Figure 2:
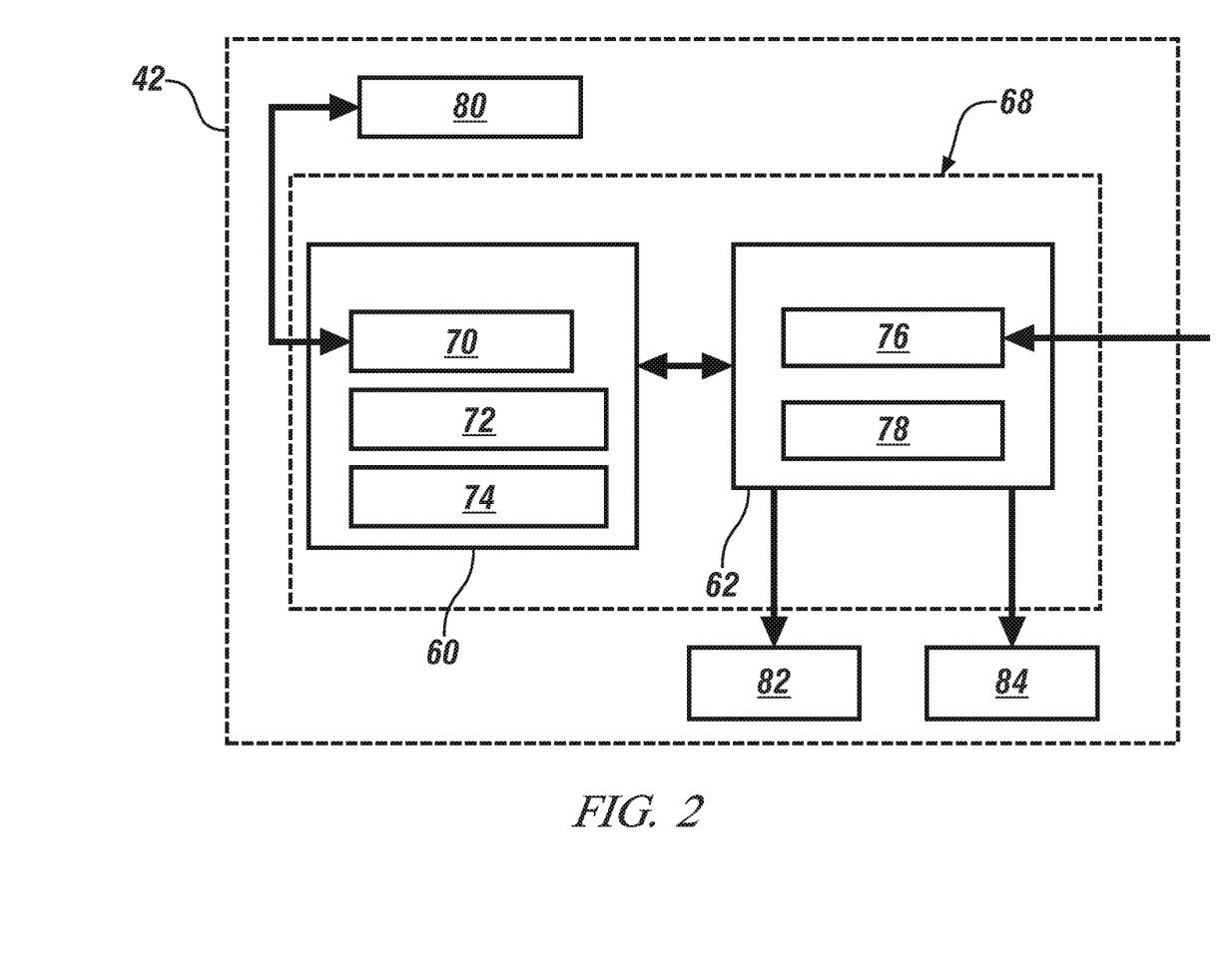
FIG. 2 is a functional block diagram of an exemplary implementation of a control module of the exhaust diagnostic control system of FIG. 1.

Referring now to FIG. 2, the control module 42 may include a component management module 60 that is used to monitor performance (e.g., conversion efficiency of NOx) of an after-treatment component 30 and/or to facilitate control over operation of the after-treatment component 30. The control module 42 further includes an exhaust gas temperature management module 62 that intrusively controls a temperature of the after-treatment component 30.

The component management module 60 includes a reset module 70 and a test initiation module 72. As used herein, the term intrusive means that the control module 42 varies the control of the engine outside of the operating conditions to allow the test to occur. The test initiation module 72 initiates an intrusive NOx reduction efficiency test in the after-treatment component after the occurrence of a trigger event, such as a recent failure of a prior NOx reduction efficiency test or the passage of a prescribed period of time or another milestone, and/or the undertaking of other remedial action.

The intrusive test initiation module 72 sends a signal to the exhaust gas temperature management module 62 to initiate intrusive temperature control of the after-treatment component prior to a NOx reduction efficiency test in the after-treatment component. A test enabling module 74 ensures that enable conditions are met prior to initiation of testing or control functions.

The exhaust gas temperature management module 62 includes an after-treatment component temperature calculating module 76 that calculates a temperature of the after-treatment component. The temperature calculating module 76 may calculate the temperature of the after-treatment component based on the inlet temperature sensor 32, the outlet temperature sensor 34, a model or any other suitable method. For example only, the temperature calculating module 76 may calculate the temperature of the after-treatment component based on values from both the inlet and outlet temperature sensors 32, 34. For example only, the temperature calculating module 76 may calculate the temperature based on an average or a weighted average of the inlet and outlet temperature sensors 32, 34.

The control module 42, the component management module 60 and/or the exhaust gas temperature management module 62 may include an operating parameter adjustment module 78 that adjusts other operating parameters prior to the intrusive NOx reduction efficiency test. For example, other operating parameters such as dosing, reductant load, EGR, and/or other conditions may also be adjusted within corresponding windows prior to the intrusive NOx reduction efficiency test.

The control module 42 includes a vehicle speed limiting module 80 that limits vehicle speed after the NOx reduction efficiency falls below a predetermined threshold. The control module 42 further includes a fueling control module 82 that determines fuel quantity, fuel injection timing, post injection, etc. When in the intrusive NOx reduction efficiency test mode, the exhaust gas temperature management module 62 adjusts fueling. The fueling adjustment increases a temperature of the after-treatment component. Alternately, a hydrocarbon injection module 84 injects fuel into the exhaust upstream from the DOC catalyst 28 to generate an exotherm to increase the temperature in the after-treatment component.

Thus, in an exemplary embodiment, an exhaust diagnostic control system 68 comprises a test enabling module 74, an exhaust gas temperature management module 62, and an exhaust diagnostic control system 68. The test enabling module 74 is configured for executing a process for depleting a reductant load and subsequently establishing a known concentration of reductant on an after-treatment component 30 following an occurrence of one or more trigger events. The exhaust gas temperature management module 62 is configured for selectively adjusting a temperature of the after-treatment component 30 to a predetermined temperature range using intrusive exhaust gas temperature management. The component management module 60 is configured for executing a NOx reduction efficiency test following completion of the process for depleting a reductant load and subsequently establishing a known concentration of reductant on the after-treatment component 30. The NOx reduction efficiency test comprises determining a NOx reduction efficiency associated with the after-treatment component 30.

The trigger event may comprise detection of an inadequate NOx reduction efficiency associated with the after-treatment component 30, an instance of a service regeneration event having occurred in the recent past, an assessment of an elevated risk of an uncontrolled or unknown quantity of ammonia loaded on the after-treatment component 30, or a sensed deviation between sensed NOx concentration in the exhaust stream and predicted NOx concentration in the exhaust stream.

The process for depleting a reductant load may comprise executing a regeneration event. The process for depleting a reductant load may also comprise commanding dosing off until the load of reductant has been depleted from the after-treatment component 30 to a level below a predetermined threshold.

The test enabling module 74 may be configured for executing a process for evaluating the extent to which NOx are reduced in the after-treatment component 30. The test enabling module 74 may be configured for executing a process for evaluating the extent to which reductant has been depleted from the after-treatment component 30 or for executing a process for comparing an information signal reflecting a NOx concentration upstream from the after-treatment component 30 to a NOx concentration downstream from the after-treatment component 30 and determining whether the difference between the NOx concentration upstream from the after-treatment component 30 and the NOx concentration downstream from the after-treatment component 30 is less than or equal to a predetermined limit.

Figure 3:
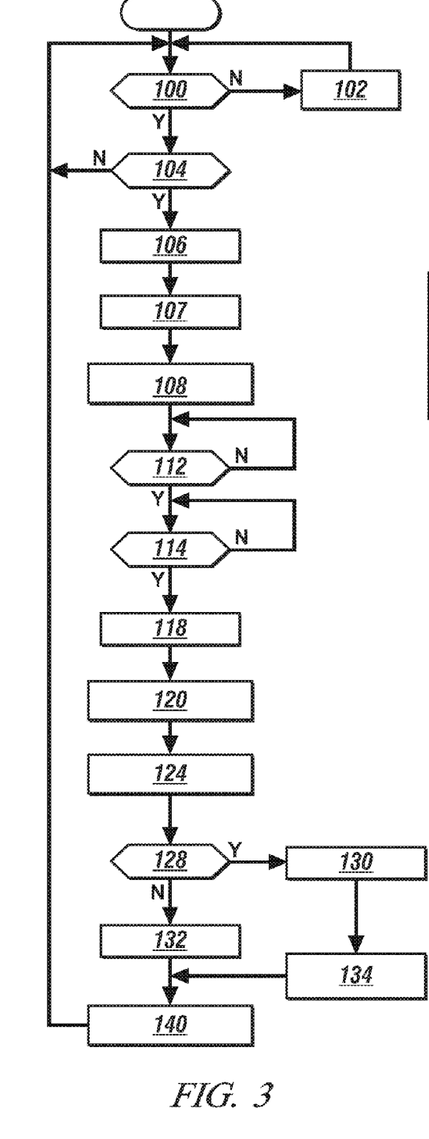
FIG. 3 illustrates a method for resetting an exhaust diagnostic control system upon the occurrence of one or more triggering criteria according to the present disclosure.

Referring now to FIG. 3, control begins at 100 where it is determined whether an intrusive NOx reduction efficiency test, or another component diagnostic test, needs to be executed based on satisfaction of one or more prescribed conditions. For example only, the intrusive after-treatment component diagnostic test (which may also be used to deduce reductant quality) may be executed after the vehicle is placed in a speed-limited mode and/or other remedial action is taken following a failure to pass a prior NOx reduction efficiency test.

If 100 is false, control proceeds in a normal mode at 102. If 100 is true, control continues at 104 and determines whether a first set of conditions are acceptable to run the test. For example only, the first set of conditions may include ensuring that regeneration of the PF 36 is not being performed. PF regeneration is typically performed when soot builds up in the PF 36. Additionally, the first set of conditions may include ensuring that adaptation is not being performed. Adaptation occurs when there is a problem with the after-treatment component such that a difference between a downstream NOx sensor measurement and an expected NOx level based on a model exceeds a predetermined tolerance level. Still other conditions may be used in the first set of conditions instead of, or in addition to, these conditions.

If 104 is false, control returns to 100. If 104 is true, control continues at 106 and optionally disables exhaust gas recirculation (EGR). At 107, control activates a process for depleting a reductant load to establish a reliable reductant load on the after-treatment component. The process for depleting a reductant load includes commanding dosing at a reduced level (e.g., off) until the reductant load has been sufficiently depleted from the after-treatment component (i.e., the algorithm determines that the reductant load on the after-treatment component has been depleted to a level less than a predetermined threshold). Optionally, a regeneration test may be initiated so as to more quickly deplete the reductant load. The sufficient depletion of reductant can be confirmed by comparing information signals produced by the upstream and downstream NOx sensors so as to verify that any detectable difference between their outputs is within an acceptable level. In addition, the load model can be observed so as to ensure that it indicates that the after-treatment component is unloaded. In an exemplary embodiment, unloading may take up to 30 minutes. After the reductant load has been depleted, and/or depletion is predicted or confirmed, dosing can be re-commenced to re-establish a known (i.e., reliably predictable by the reductant load model) load on the after-treatment component. Thereafter, normal dosing may be resumed.

At 108, control activates an intrusive NOx reduction efficiency test to achieve a predetermined temperature range for the after-treatment component. Control also turns dosing on at 108. At 112, control determines whether there is a sufficient reductant load on the after-treatment component (i.e., the catalyst) 30. A time delay may be used to ensure that the sufficient reductant load has been re-established to provide acceptable NOx conversion.

If 112 is false, control waits until there is a sufficient reductant load on the after-treatment component. At 114, control determines whether a second set of enable conditions have been met. For example only, the second set of enable conditions may include one or more of the following conditions: exhaust flow within a predetermined range; upstream NOx mass flow within a predetermined range; upstream NOx concentration within a predetermined range and/or NOx sensors ready. Still other conditions may be included in the second set of enable conditions.

At 118, control measures an efficiency of the NOx conversion/reduction process in the after-treatment component. At 120, control generates an efficiency of the NOx reduction (i.e., conversion) process as a function of upstream and downstream accumulated masses. At 124, control generates an efficiency threshold as a function of upstream NOx and after-treatment component temperature. The efficiency threshold may be expressed as a percentage.

At 128, control determines whether the efficiency of the NOx conversion process is greater than or equal to the efficiency threshold. If 128 is true, control declares an approval status (which may be interpreted as signaling acceptable reductant quality and/or after-treatment component operation based on acceptable NOx reduction efficiency) at 130. If 128 is false, control declares an unacceptable condition (which may be interpreted as an unacceptable reductant quality and/or an unacceptable after-treatment component operation based on an unacceptable NOx reduction efficiency) at 132. In the event of a declaration of an unacceptable condition, remedial measures may be undertaken such as illumination of a warning light or initiation of modifications to the manner in which the after-treatment component and/or the engine and/or the vehicle is operated. Upon declaration of an approval status, control continues from 130 with 134 and disables whichever failure mode may have caused the initiation of the intrusive test. For example, the vehicle speed limiting mode and/or other remedial measures are ended. Control continues from 132 and 134 with 140 where control ends intrusive exhaust gas temperature management and enables EGR (if previously disabled).

Figure 4:
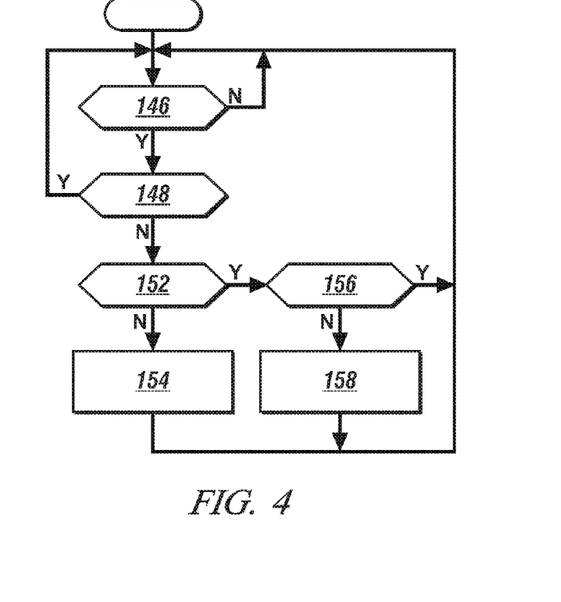
FIG. 4 illustrates a method for controlling the temperature of a catalyst of an after-treatment component.

Referring now to FIG. 4, an intrusive exhaust gas temperature management method is shown. At 146, control determines whether the intrusive NOx reduction efficiency test is running. If 146 is false, control returns to 146. If 146 is true, control continues at 148 where control determines whether the after-treatment component temperature is within a predetermined temperature range (for example, between a minimum temperature TLo and a maximum temperature THi).

If 148 is true, control returns to 146. If 148 is false, control determines whether the after-treatment component temperature is greater than the minimum temperature TLo at 152. If 152 is false, control increases the exhaust temperature in any suitable manner. For example, the exhaust temperature can be increased by altering fueling (fuel quantity, fuel injection timing, post injection, etc.) and/or by starting or increasing HC injection at 154. Control returns to 146.

If 148 is false, control determines whether the after-treatment component temperature is less than the maximum temperature THi at 156. If 156 is false, control decreases the exhaust temperature in any suitable manner. For example, the exhaust temperature can be decreased by altering fueling (fuel quantity, fuel injection timing, post injection, etc.) and/or by stopping or decreasing HC injection at 158. Control returns to 146.

Thus, a method for diagnosing an exhaust system comprises depleting a reductant load on an after-treatment component following an occurrence of one or more trigger events and subsequently establishing a known concentration of reductant on the after-treatment component (step 107). The method also comprises selectively adjusting a temperature of the after-treatment component to a predetermined temperature range using intrusive exhaust gas temperature management (step 108) and executing a NOx reduction efficiency test comprising determining a NOx reduction efficiency associated with an after-treatment component (step 118). Exhaust gas temperature can be controlled, for example, by adjusting levels of fuel in the exhaust gas. The process for depleting a reductant load (step 107) may comprise executing a regeneration event and/or may comprise commanding dosing off until the load of reductant has been depleted from the after-treatment component to a level below a predetermined threshold.

The method may also comprise evaluating the extent to which NOx are reduced in the after-treatment component and/or evaluating the extent to which reductant has been depleted from the after-treatment component (step 118). The method may also comprise comparing an information signal reflecting a NOx concentration upstream from the after-treatment component to a NOx concentration downstream from the after-treatment component and determining whether the difference between the NOx concentration upstream from the after-treatment component and the NOx concentration downstream from the after-treatment component is less than or equal to a predetermined limit.

By completely, or nearly completely, depleting the load of NH3 of the after-treatment component, and subsequently re-establishing a reliably knowable load of NH3 on the after-treatment component, the control can reliably ensure that the NH3 load estimate is accurate and can ensure that after-treatment diagnostic tests are performed at times and under conditions that facilitate reliable knowledge of the NH3 load present on the after-treatment catalyst. This increases the robustness of the after-treatment efficiency diagnostic and avoids the inappropriate initiation of unnecessary remedial measures such as false warning light illumination or overzealous DEF Quality Inducement on vehicles after a DPF Service Regeneration process has been performed. As a result, better control over emission components, engine systems, and vehicles may be enabled, and customer satisfaction may be improved, warranty costs may be reduced, and confusion may be reduced.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. An exhaust diagnostic control system, comprising:
a control module comprising a processor coupled to a memory, the control module configured for identifying a risk of potential future NOx deviation in an after-treatment component;
a test enabling module comprising a processor coupled to a memory, the test enabling module configured for executing a process for depleting a reductant load, and subsequently establishing a known concentration of reductant, on the after-treatment component following identification of the risk of potential future NOx deviation, rather than following confirmation of an actual NOx deviation;
an exhaust gas temperature management module comprising a processor coupled to a memory, the exhaust gas temperature management module configured for selectively adjusting a temperature of the after-treatment component to a predetermined temperature range using intrusive exhaust gas temperature management; and
a component management module comprising a processor coupled to a memory, the component management module configured for executing, after completion of the process for depleting a reductant load and subsequently establishing a known concentration of reductant on the after-treatment component, a test for determining a reduction efficiency associated with the after-treatment component, the test for determining a reduction efficiency comprising determining a NOx reduction efficiency of the after-treatment component.

2. An exhaust diagnostic control system as in claim 1, wherein the process for depleting a reductant load comprises executing a regeneration event.

3. An exhaust diagnostic control system as in claim 1, wherein the process for depleting a reductant load comprises commanding dosing off until a load of reductant has been depleted from the after-treatment component to a level below a predetermined threshold.

4. An exhaust diagnostic control system as in claim 1, wherein the test enabling module is configured for executing a process for evaluating an extent to which NOx are reduced in the after-treatment component.

5. An exhaust diagnostic control system as in claim 4, wherein the test enabling module is configured for executing a process for evaluating the extent to which reductant has been depleted from the after-treatment component.

6. An exhaust diagnostic control system as in claim 4, wherein the test enabling module is configured for executing a process for comparing an information signal reflecting a NOx concentration upstream from the after-treatment component to a NOx concentration downstream from the after-treatment component and determining whether a difference between the NOx concentration upstream from the after-treatment component and the NOx concentration downstream from the after-treatment component is less than or equal to a predetermined limit.

7. An exhaust diagnostic control system as in claim 1, wherein the control module is further configured for:
    determining if the established known concentration of reductant is sufficient for NOx conversion in the after-treatment component; and
    measuring an efficiency of an NOx reduction process in the after-treatment component.

8. An exhaust diagnostic control system as in claim 7, wherein the control module is further configured for:
    generating the efficiency of the NOx reduction process of the after-treatment component as a function of accumulated masses upstream and downstream of the after-treatment component; and
    generating an efficiency threshold as a function of NOx upstream of the after-treatment component and a temperature of the after-treatment component.

9. An exhaust diagnostic control system as in claim 8, wherein the component management module is further configured for:
    determining whether the efficiency is greater than or equal to the efficiency threshold; and
    subsequently generating an approval status or an unacceptable condition status based on whether the determined efficiency is greater than or equal to the efficiency threshold.

10. A method for diagnosing an exhaust system comprising:
    configuring a control module comprising a processor coupled to a memory for:
    determining if a risk exists that an actual reductant load in an after-treatment component fails to match a load predicted by a model, rather than determining an actual difference between the actual reductant load and the predicted load;
    depleting a reductant load on an after-treatment component following determining that the risk exists that an actual reductant load in the after-treatment component fails to match the load predicted by the model;
    subsequently establishing a known concentration of reductant on the after-treatment component;
    selectively adjusting a temperature of the after-treatment component to a predetermined temperature range using intrusive exhaust gas temperature management; and
    executing a NOx reduction efficiency test comprising determining a NOx reduction efficiency associated with the after-treatment component.

11. A method for diagnosing an exhaust system as in claim 10, further comprising determining, prior to depleting the reductant load, an inadequate NOx reduction efficiency of the after-treatment component.

12. A method for diagnosing an exhaust system as in claim 10, wherein the trigger event comprises an instance of a service regeneration event.

13. A method for diagnosing an exhaust system as in claim 10, wherein the trigger event comprises an elevated risk of an uncontrolled or unknown quantity of ammonia loaded on the after-treatment component.

14. A method for diagnosing an exhaust system as in claim 10, wherein the trigger event comprises a sensed deviation between sensed NOx concentration and predicted NOx concentration.

15. A method for diagnosing an exhaust system as in claim 10, wherein depleting a reductant load comprises executing a regeneration event.

16. A method for diagnosing an exhaust system as in claim 10, wherein depleting a reductant load comprises commanding dosing off until a load of reductant has been depleted from the after-treatment component to a level below a predetermined threshold.

17. A method for diagnosing an exhaust system as in claim 10, further comprising executing a process for evaluating an extent to which reductant has been depleted from the after-treatment component.

18. A method for diagnosing an exhaust system as in claim 10, further comprising executing a process for evaluating an extent to which NOx are reduced in the after-treatment component.

19. A method for diagnosing an exhaust system as in claim 18, further comprising executing a process for comparing an information signal reflecting a NOx concentration upstream from the after-treatment component to a NOx concentration downstream from the after-treatment component and determining whether a difference between the NOx concentration upstream from the after-treatment component and the NOx concentration downstream from the after-treatment component is less than or equal to a predetermined limit.

20. A method for diagnosing an exhaust system, the method comprising:
    configuring a control module comprising a processor coupled to a memory for:
    performing a regeneration of a particulate filter;
    identifying, after the regeneration, a risk of potential future NOx deviation in an after-treatment component, without confirming an actual NOx deviation;
    depleting a reductant load on the after-treatment component based on the determination of risk of potential future NOx deviation;
    confirming the depleted reductant load on the after-treatment component;
    subsequently establishing a known concentration of reductant on the after-treatment component;
    activating an intrusive NOx reduction efficiency test on the after-treatment component by selectively adjusting a temperature of the after-treatment component to a predetermined temperature range;

determining if the established known concentration of reductant is sufficient for NOx conversion in the after-treatment component;

measuring, after establishing the known concentration of reductant, an efficiency of an NOx reduction process of the after-treatment component;

generating the efficiency of the NOx reduction process as a function of accumulated masses upstream and downstream of the after-treatment component;

generating an efficiency threshold as a function of NOx upstream of the after-treatment component and a temperature of the after-treatment component;

determining whether the efficiency is greater than or equal to the efficiency threshold; and generating an approval status if the efficiency is greater than or equal to the efficiency threshold.

* * * * *